(12) United States Patent
Mizoguchi

(10) Patent No.: US 8,411,341 B2
(45) Date of Patent: *Apr. 2, 2013

(54) ACTUATOR, OPTICAL SCANNER, AND IMAGE FORMING DEVICE

(75) Inventor: Yasushi Mizoguchi, Chino (JP)

(73) Assignee: Seiko Epson Corporation (JP)

( * ) Notice: Subject to any disclaimer, the term of this patent is extended or adjusted under 35 U.S.C. 154(b) by 0 days.

This patent is subject to a terminal disclaimer.

(21) Appl. No.: 13/524,220

(22) Filed: Jun. 15, 2012

(65) Prior Publication Data

US 2012/0250126 A1 Oct. 4, 2012

Related U.S. Application Data

(60) Continuation of application No. 13/167,280, filed on Jun. 23, 2011, now Pat. No. 8,320,033, which is a continuation of application No. 12/851,608, filed on Aug. 6, 2010, now Pat. No. 7,990,597, which is a division of application No. 12/706,131, filed on Feb. 16, 2010, now Pat. No. 7,894,113, which is a continuation of application No. 12/029,622, filed on Feb. 12, 2008, now Pat. No. 7,688,490.

(30) Foreign Application Priority Data

Mar. 7, 2007 (JP) .................................. 2007-057817

(51) Int. Cl.
*G02B 26/08* (2006.01)
(52) U.S. Cl. ............... 359/199.3; 359/200.7; 359/213.1; 310/36
(58) Field of Classification Search .... 359/198.1–199.1, 359/199.3, 200.7, 213.1–215.1, 221.2; 310/36
See application file for complete search history.

(56) References Cited

U.S. PATENT DOCUMENTS

| 5,486,944 | A | * | 1/1996 | Bard et al. ................. 359/198.1 |
| 6,765,706 | B2 | | 7/2004 | Tokuda et al. |
| 6,897,990 | B2 | | 5/2005 | Yagi et al. |
| 6,924,915 | B2 | | 8/2005 | Hirose et al. |
| 6,949,996 | B2 | | 9/2005 | Matsumoto et al. |
| 7,688,490 | B2 | | 3/2010 | Mizoguchi |
| 7,697,181 | B2 | | 4/2010 | Mizoguchi |
| 7,852,539 | B2 | | 12/2010 | Mizoguchi |

(Continued)

FOREIGN PATENT DOCUMENTS

| CN | 101261363 | 9/2008 |
| CN | 101261364 | 9/2008 |

(Continued)

*Primary Examiner* — James Phan
(74) *Attorney, Agent, or Firm* — Harness, Dickey & Pierce, P.L.C.

(57) ABSTRACT

An actuator includes: a first oscillatory system including a frame-shaped driving member and a pair of first axial members holding the driving member from both ends so as to allow the driving member to rotate around an X-axis; a second oscillatory system including a movable plate provided inside the driving member and a pair of second axial members holding the movable plate to the driving member from both ends so as to allow the movable plate to rotate around a Y-axis perpendicular to the X axis; and a driving unit including a permanent magnet provided on the driving member, a coil provided so as to face the permanent magnet, a voltage applying unit applying a voltage to the coil, and the permanent magnet has a relief section to avoid making contact with the movable plate.

10 Claims, 5 Drawing Sheets

U.S. PATENT DOCUMENTS

| | | |
|---|---|---|
| 7,894,113 B2 | 2/2011 | Mizoguchi |
| 7,990,597 B2 | 8/2011 | Mizoguchi |
| 2002/0130561 A1 | 9/2002 | Temesvary et al. |
| 2011/0249310 A1 | 10/2011 | Mizoguchi |

FOREIGN PATENT DOCUMENTS

| | | |
|---|---|---|
| CN | 101887168 | 11/2010 |
| JP | 08-322227 | 12/1996 |
| JP | 2000-235152 | 8/2000 |
| JP | 2002-148536 | 5/2002 |
| JP | 2002-307396 | 10/2002 |
| JP | 2003-255259 | 9/2003 |
| JP | 2004-110005 | 4/2004 |
| JP | 2004-297923 | 10/2004 |
| JP | 2005-148459 | 6/2005 |
| JP | 2007-078819 | 3/2007 |

\* cited by examiner

ACTUATOR, OPTICAL SCANNER, AND IMAGE FORMING DEVICE

CROSS REFERENCE TO RELATED APPLICATIONS

This application is a continuation application of U.S. Ser. No. 13/167,280 filed Jun. 23, 2011, now U.S. Pat. No. 8,320,033 which is a continuation of U.S. Ser. No. 12/851,608 filed Aug. 6, 2010, now U.S. Pat. No. 7,990,597 issued Aug. 2, 2011, which is a divisional application of U.S. Ser. No. 12/706,131 filed Feb. 16, 2010, now U.S. Pat. No. 7,894,113 issued Feb. 22, 2011, which is a continuation application of U.S. Ser. No. 12/029,622 filed Feb. 12, 2008, now U.S. Pat. No. 7,688,490 issued Mar. 30, 2010 and claiming priority to Japanese Patent Application No. 2007-057817 filed Mar. 7, 2007, all of which are incorporated by reference in their entireties.

BACKGROUND

1. Technical Field

The present invention relates to an actuator, an optical scanner, and an image forming device.

2. Related Art

An optical scanner is disclosed that scans light two dimensionally and draws images by scanning light in a printer or the like. For example, refer to JP-A-8-322227.

The optical scanner disclosed in JP-A-8-322227 includes a scanner main body including a frame-shaped outer movable plate, a pair of first torsion bars axially supporting the outer movable plate so as to allow the outer movable plate to swing (rotate) around an X-axis, an inner movable plate provided inside the outer movable plate, and a pair of second torsion bars axially supporting the inner movable plate to allow the inner movable plate to swing around a Y-axis perpendicular to the X-axis. The optical scanner also includes a pair of driving coils respectively provided on the outer movable plate and the inner movable plate, and a pair of permanent magnets provided so as to face each other with the scanner main body therebetween.

However, in such optical scanner, the pair of permanent magnets is provided so as to face each other with the scanner main body therebetween. Therefore, it is difficult to downsize the optical scanner. In addition, it is also difficult to reduce the costs since the driving coil is respectively provided on the outer movable plate and the inner movable plate.

SUMMARY

An advantage of the present invention is to provide an actuator in which a movable plate can be rotated around each of an X-axis and a Y-axis, an optical scanner, and an image forming device while achieving low costs and downsizing.

The above advantage is achieved as follows.

An actuator of a first aspect of the invention includes a first oscillatory system, a second oscillatory system, and a driving unit. The first oscillatory system includes a frame-shaped driving member and a pair of first axial members. The pair of first axial members holds the driving member from both ends so as to allow the driving member to rotate around an X-axis. The second oscillatory system includes a movable plate provided inside the driving member and a pair of second axial members. The pair of second axial members holds the movable plate to the driving member from both ends so as to allow the movable plate to rotate around a Y-axis perpendicular to the X-axis. The driving unit includes a permanent magnet provided on the driving member, a coil provided so as to face the permanent magnet, and a voltage applying unit that applies a voltage to the coil. The permanent magnet is provided such that a line segment connecting both poles is slanted with respect to each of the X-axis and the Y-axis, in a plan view of the movable plate. The voltage applying unit includes a voltage generating section and a voltage superimposing section. The voltage generating section generates a first alternating voltage and a second alternating voltage each of which having a frequency different from each other. The voltage superimposing section superimposes the first voltage and the second voltage. The movable plate is rotated around the Y-axis at a frequency of the second voltage while being rotated around the X-axis at a frequency of the first voltage by applying the voltage superimposed by the voltage superimposing section to the coil.

As a result, an actuator can be provided in which the movable plate can be rotated around each of the X-axis and the Y-axis, while achieving low costs and downsizing.

In the actuator, it is preferable that the frequency of the first voltage be equal to a resonance frequency of the first oscillatory system or the frequency of the second voltage be equal to a resonance frequency of the second oscillatory system.

As a result, the movable plate can be smoothly rotated around each of the X-axis and the Y-axis.

In the actuator, it is preferable that the frequency of the second voltage be equal to the resonance frequency of the second oscillatory system and the frequency of the first voltage differ from the resonance frequency of the first oscillatory system.

As a result, the movable plate can be very smoothly rotated around each of the X-axis and the Y-axis.

In the actuator, it is preferable that the frequency of the second voltage be higher than the frequency of the first voltage.

As a result, the movable plate can be reliably and smoothly rotated around the Y-axis at the frequency of the second voltage, while being rotated around the X-axis at the frequency of the first voltage.

In the actuator, it is preferable that the permanent magnet have a longitudinal shape and be provided along a line segment that passes through an intersection of the X-axis and the Y-axis and slants at an angle of from 30 to 60 degrees with respect to the X-axis or the Y-axis.

As a result, the movable plate can be very smoothly rotated around each of the X-axis and the Y-axis.

In the actuator, it is preferable that the permanent magnet have a relief section to avoid making contact with the movable plate.

As a result, the movable plate can be more smoothly rotated around the Y-axis.

In the actuator, it is preferable that the relief section be a recess formed on a surface of the permanent magnet, the surface being at a side adjacent to the movable plate.

As a result, the relief section can be very easily formed.

In the actuator, it is preferable that the coil be provided directly below the permanent magnet.

As a result, the power consumption reduction and size reduction of the actuator can be achieved.

In the actuator, it is preferable that the coil be formed so as to surround an outer circumference of the driving member, in the plan view of the movable plate.

As a result, the separating distance between the coil and the permanent magnet can be shortened greatly. Therefore, a magnetic field generated from the coil can efficiently work on the permanent magnet.

In the actuator, it is preferable that the movable plate include a light reflecting section having a light reflective characteristic on one surface opposing the other surface facing the permanent magnet.

As a result, the actuator can be used as an optical device included in image forming devices such as laser printers, bar code readers, confocal scanning laser microscopes, and imaging displays.

An optical scanner according to a second aspect of the invention includes a first oscillatory system, a second oscillatory system, and a driving unit. The first oscillatory system includes a frame-shaped driving member and a pair of first axial members. The pair of first axial members holds the driving member from both ends so as to allow the driving member to rotate around an X-axis. The second oscillatory system includes a movable plate provided inside the driving member, and a pair of second axial members. The movable plate includes a light reflecting section having a light reflective characteristic. The pair of second axial members holds the movable plate to the driving member from both ends so as to allow the movable plate to rotate around a Y-axis perpendicular to the X-axis. The driving unit includes a permanent magnet provided on the driving member, a coil provided so as to face the permanent magnet, and a voltage applying unit that applies a voltage to the coil. The permanent magnet is provided such that a line segment connecting both poles is slanted with respect to each of the X-axis and the Y-axis, in a plan view of the movable plate. The voltage applying unit includes a voltage generating section and a voltage superimposing section. The voltage generating section generates a first alternating voltage and a second alternating voltage each of which having a frequency different from each other. The voltage superimposing section superimposes the first voltage and the second voltage. The movable plate is rotated around the Y-axis at a frequency of the second voltage while being rotated around the X-axis at a frequency of the first voltage by applying the voltage superimposed by the voltage superimposing section to the coil. Light reflected by the light reflecting section is two-dimensionally scanned.

As a result, an optical scanner can be provided that can rotate movable plate around each of the X-axis and the Y-axis and two-dimensionally scan light, while achieving low costs and downsizing.

An image forming device according to a third aspect of the invention includes an optical scanner that includes a first oscillatory system, a second oscillatory system, and a driving unit. The first oscillatory system includes a frame-shaped driving member and a pair of first axial members. The pair of first axial members holds the driving member from both ends so as to allow the driving member to rotate around an X-axis. The second oscillatory system includes a movable plate provided inside the driving member and a pair of second axial members. The movable plate has a light reflecting section having a light reflective characteristic. The pair of second axial members holds the movable plate to the driving member from both ends so as to allow the movable plate to rotate around a Y-axis perpendicular to the X-axis. The driving unit includes a permanent magnet provided on the driving member, a coil provided so as to face the permanent magnet, and a voltage applying unit that applies a voltage to the coil. The permanent magnet is provided such that a line segment connecting both poles is slanted with respect to each of the X-axis and the Y-axis, in a plan view of the movable plate. The voltage applying unit includes a voltage generating section and a voltage superimposing section. The voltage generating section generates a first alternating voltage and a second alternating voltage each of which having a frequency different from each other. The voltage superimposing section superimposes the first voltage and the second voltage. The movable plate is rotated around the Y-axis at a frequency of the second voltage while being rotated around the X-axis at a frequency of the first voltage by applying the voltage superimposed by the voltage superimposing section to the coil. Light reflected by the light reflecting section is two-dimensionally scanned.

As a result, an image forming device can be provided that includes the optical scanner that can rotate movable plate around each of the X-axis and the Y-axis and two-dimensionally scan light, while achieving low costs and downsizing.

BRIEF DESCRIPTION OF THE DRAWINGS

The invention will be described with reference to the accompanying drawings, wherein like numbers reference like elements.

DESCRIPTION OF EXEMPLARY EMBODIMENTS

An actuator, an optical scanner, and an image forming device according to an exemplary embodiment of the invention will be described with reference to the accompanying drawings.

Figure 1:
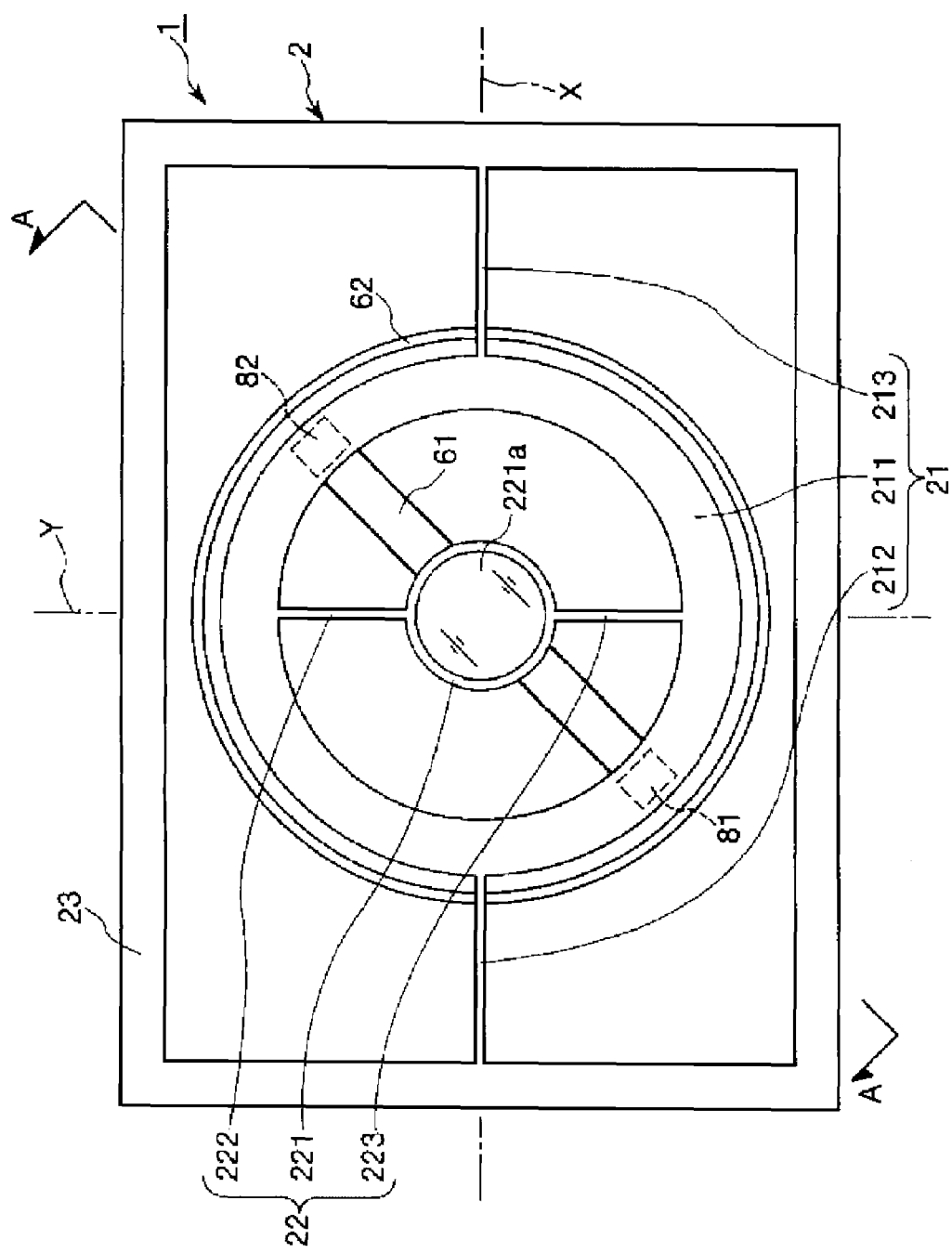
FIG. 1 is a perspective view of an actuator according to an exemplary embodiment of the present invention.
Figure 2:
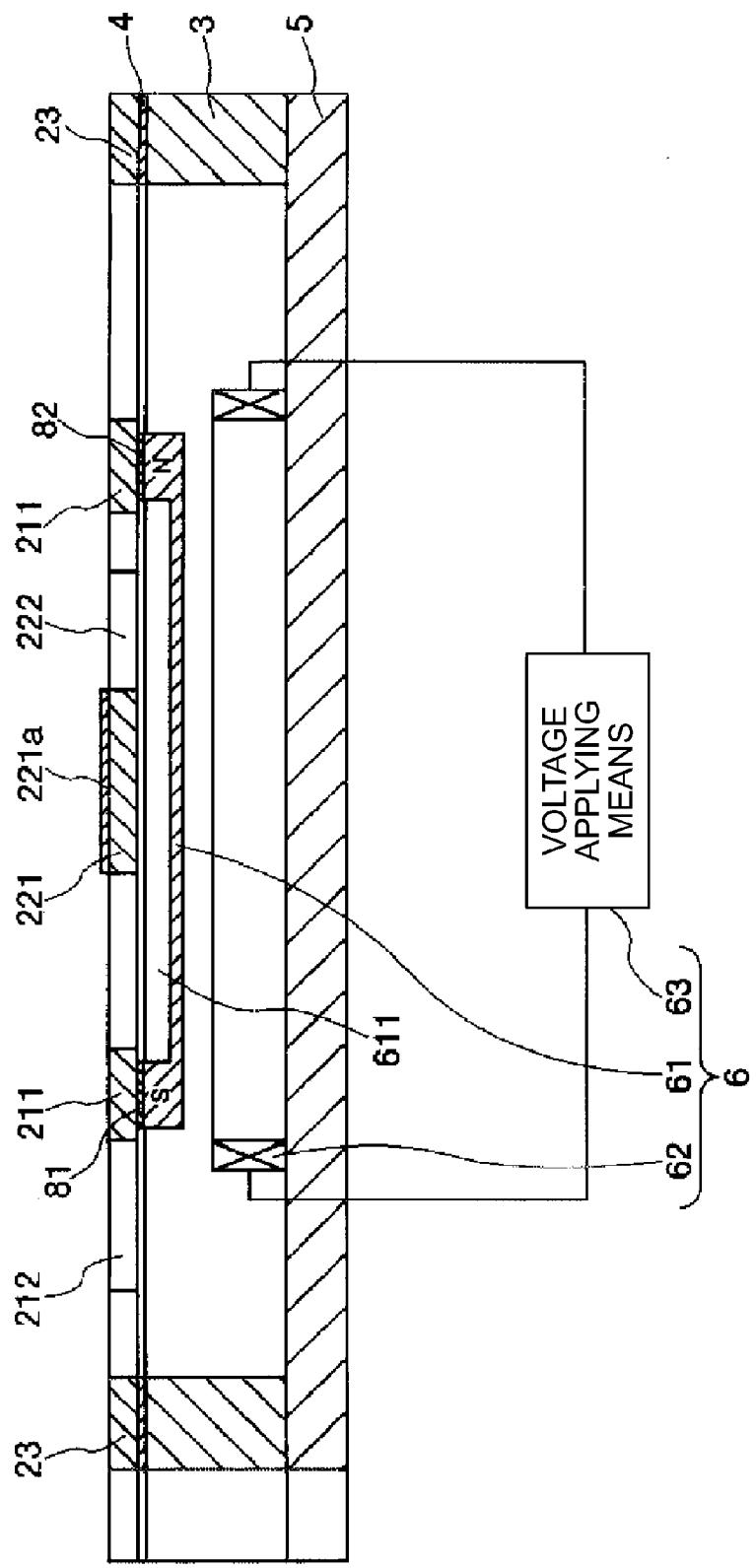
FIG. 2 is a sectional view taken along line A-A in FIG. 1.
Figure 3:
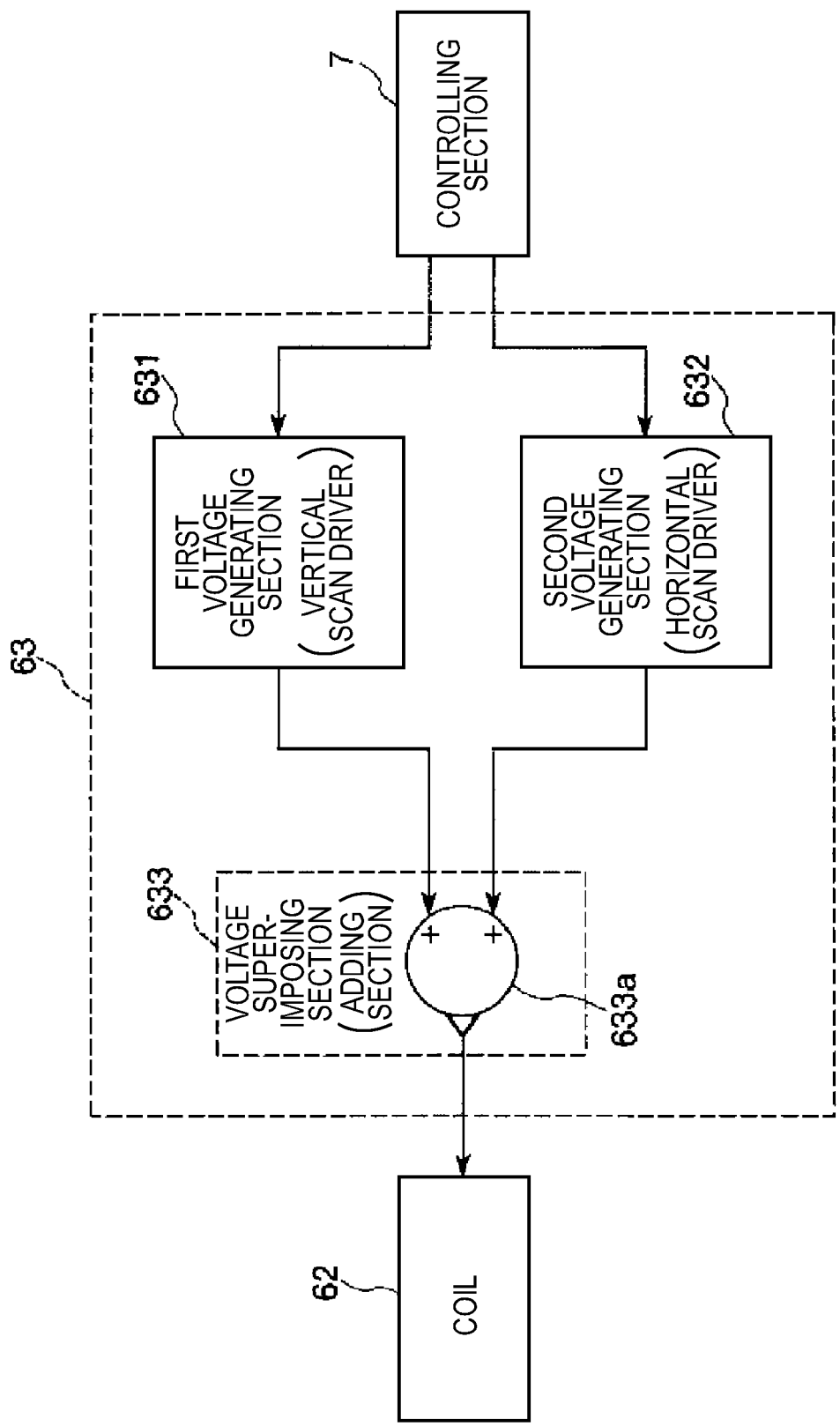
FIG. 3 is a block diagram of a voltage applying unit of a driving unit included in the actuator shown in FIG. 1.
Figure 4A:
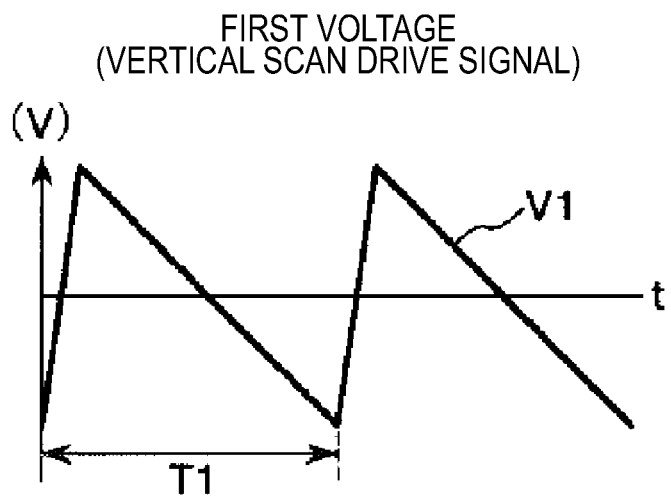
FIGS. 4A and 4B are diagrams showing an example of voltages generated at a first voltage generating section and a second voltage generating section shown in FIG. 3.
Figure 4B:
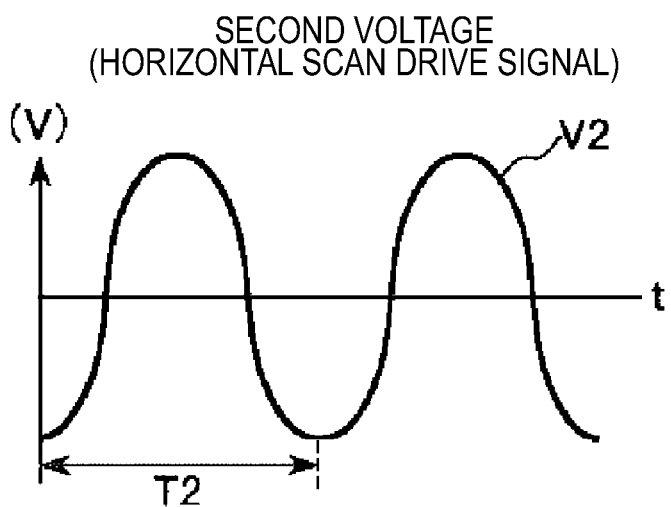

FIG. 1 is a plan view of the actuator according to the exemplary embodiment of the present invention. FIG. 2 is a sectional view taken along line A-A in FIG. 1. FIG. 3 is a block diagram of a driving unit included in the actuator shown in FIG. 1. FIGS. 4A and 4B are diagrams showing an example of voltages generated at a first voltage generating section and a second voltage generating section shown in FIG. 3. For expository convenience, the front side, the rear side, the right side, and the left side in FIG. 1 are described as "up," "down or low," "right," and "left" respectively. Likewise, the top side, the bottom side, the right side, and the left side in FIG. 2 and FIG. 3 are described as "up," "down or low," "right," and "left" respectively.

As shown in FIG. 1, an actuator 1 includes a substrate 2 that includes a first oscillatory system 21 and a second oscillatory system 22. As shown in FIG. 2, the actuator 1 also includes a supporting substrate 3, a counter substrate 5, and a driving unit 6. The supporting substrate 3 supports the substrate 2 with a bonding layer 4 therebetween. The counter substrate 5 faces the substrate 2 with the supporting substrate 3 therebetween. The driving unit 6 respectively drives the first oscillatory system 21 and the second oscillatory system 22.

As shown in FIG. 1, the substrate 2 includes a frame-shaped supporting section 23, the first oscillatory system 21 supported by the supporting section 23, and the second oscillatory system 22 supported by the first oscillatory system 21.

The first oscillatory system 21 includes a frame-shaped driving member 211 and a pair of first axial members 212 and 213. The driving member 211 is provided inside the supporting section 23. The pair of first axial members 212 and 213 holds the driving member 211 to the supporting section 23 from both ends. The second oscillatory system 22 includes a movable plate 221 and a pair of second axial members 222 and 223. The movable plate 221 is provided inside the driving member 211. The pair of second axial members 222 and 223 holds the movable plate 221 to the driving member 211 from both ends.

In other words, the substrate 2 includes the movable plate 221, the pair of second axial members 222 and 223, the driving member 211, the pair of first axial members 212 and 213, and the supporting section 23.

The driving member 211 is disk-shaped in plan view of FIG. 1 (in other words, in a plan view of the movable plate 221). However, the shape of the driving member 211 is not particularly limited as long as the driving member 211 is in the shape of a frame. A permanent magnet 61, described hereafter, is provided on a bottom surface of the driving member 211. The driving member 211 is supported and held to the supporting section 23 from both ends by the pair of first axial members 212 and 213.

Each of the first axial members 212 and 213 is longitudinally shaped and can be elastically deformed. Each of the first axial members 212 and 213 connects the driving member 211 and the supporting section 23 so as to allow the driving member 211 to rotate relative to the supporting section 23. The first axial members 212 and 213 are coaxially provided. The driving member 211 rotates relative to the supporting section 23 with the coaxial axis (referred to, hereinafter, as a "rotation center axis X") as the center.

The movable plate 221 formed inside the driving member 211 has a circular shape in the plan view. However, the shape of the movable plate 221 is not limited. A light reflecting section 221a having a light-reflective characteristic is formed on the top surface of the movable plate 221. The movable plate 221 is held to the driving member 21 from both ends by the pair of second axial members 222 and 223.

Each of the second axial members 222 and 223 is longitudinally shaped and can be elastically deformed. Each of the second axial members 222 and 223 connects the movable plate 221 and the driving member 211 so as to allow the movable plate 221 to rotate relative to the driving member 211. The second axial members 222 and 223 are coaxially provided. The movable plate 221 rotates relative to the driving member 211 with the coaxial axis (referred to, hereinafter, as a "rotation center axis Y") as the center.

As shown in FIG. 1, the rotation center axis X and the rotation center axis Y are perpendicular to each other. In other words, the rotation center axis X and the rotation center axis Y form a 90-degree angle. Each of the center of the driving member 211 and the center of the movable plate 221 is positioned on the intersection of the rotation center axis X and the rotation center axis Y in plan view of FIG. 1.

The substrate 2 is mainly made of, for example, silicon. The movable plate 221, the second axial members 222 and 223, the driving member 211, the first axial members 212 and 213, and the supporting section 23 are formed integrally. Through use of silicon as the main material, superior rotational characteristics can be achieved and superior durability can be achieved. Moreover, fine processing (manufacturing) can be performed, and the actuator 1 can be downsized.

As for the substrate 2, the movable plate 221, the second axial members 222 and 223, the driving member 211, the first axial members 212 and 213, and the supporting section 23 can be formed from a substrate having a layered structure, such as a silicon-on-insulator (SOI) substrate. In this case, the movable plate 221, the second axial members 222 and 223, the driving member 211, the first axial members 212 and 213, and the supporting section 23 are preferably integrally formed from one layer of the layered-structure substrate.

As shown in FIG. 2, the substrate 2 is joined with the supporting substrate 3, with the bonding layer 4 therebetween. The supporting substrate 3 is formed, for example, with glass or silicon as the main material. The supporting substrate 3 has almost the same shape as the supporting section 23 (in other words, has a frame-shape) in plan view of the movable plate 221. However, the shape of the supporting substrate 3 is not particularly limited as long as the supporting substrate 3 can support the substrate 2. The supporting substrate 3 can also be omitted depending on the shape of the supporting section 23 and the like.

The bonding layer 4 formed between the supporting substrate 3 and the substrate 2 can be formed, for example, with glass, silicon, or SiO$_2$ as the main material. However, the bonding layer 4 can be omitted. In other words, the substrate 2 and the supporting substrate 3 can be directly bonded.

As shown in FIG. 2, the counter substrate 5 is provided so as to face the substrate 2, with the supporting substrate 3 therebetween. The counter substrate 5 is formed, for example, with glass or silicon as the main material.

A coil 62 is provided on the top surface of the counter substrate 5 to generate a magnetic field acting on the permanent magnet 61. As shown in FIG. 2, the coil 62 is electrically connected with a voltage applying unit 63. The permanent magnet 61, the coil 62, and the voltage applying unit 63 form the driving unit 6.

As shown in FIG. 2, the permanent magnet 61 is longitudinally shaped. The permanent magnet 61 is joined with the bottom surface of the driving member 211, with adhesive layers 81 and 82 therebetween. In other words, the permanent magnet 61 is provided to a side adjacent to one side, opposing the other side on which the light reflecting section 221a is disposed, of the movable plate 221. This structure can prevent a light scanning on the light reflector 221a from being hindered by the permanent magnet 61.

In plan view of FIG. 1, the permanent magnet 61 is provided along a line segment (the line segment is also referred to, hereinafter, as a "line segment J") that passes through the intersection (also referred to, hereinafter, as an "intersection G") of the rotation center axis X and the rotation center axis Y, and slants with respect to each of the rotation center axis X and the rotation center axis Y.

The permanent magnet 61 has an S pole at one end part while a north pole at the other part, in the longitudinal direction with respect to the intersection G. In other words, a line segment connecting the S pole and the N pole of the permanent magnet 61 (in other words, the line segment J) is slanted with respect to each of the rotation center axis X and the rotation center axis Y. The permanent magnet 61 is illustrated so as to have the S pole at the left side while the N pole at the right side in its longitudinal direction in FIG. 2 for expository convenience.

In planar view of FIG. 1, a tilt angle θ of the line segment J with respect to the rotation center axis X is preferably from 30 to 60 degrees, more preferably from 40 to 50 degrees, and further preferably almost 45 degrees. As a result of the permanent magnet 61 being provided as described above, the movable plate 221 can be very smoothly rotated around each of the rotation center axis X and the rotation center axis Y. On the other hand, when the tilt angle θ is less than the minimum value, the movable plate 221 cannot be smoothly rotated around the axis X depending on the strength of the voltage applied to the coil 62 and the like. On the other hand, when the tilt angle θ exceeds the maximum value, the movable plate 221 cannot be smoothly rotated around the axis Y depending on the strength of the voltage applied to the coil 62 and the like.

According to the embodiment, the line segment J is slanted at 45 degrees with respect to each of the rotation center axis X and the rotation center axis Y.

As shown in FIG. 2, a recess 611 is formed to a surface, at a side adjacent to the movable plate 221, of the permanent magnet 61 (in other words, the top surface). The recess 611 is a relief section provided to avoid making contact between the permanent magnet 62 and the movable plate 221. As a result of the recess (relief section) 611 being formed, the rotation of the movable plate 221 around the rotation center axis Y can be performed smoothly. In addition, because the relief section is the recess 611, the contact between the permanent magnet 61 and the movable plate 221 can be very easily prevented. However, the relief section is not particularly limited, as long as the contact between the movable plate 221 and the permanent magnet 61 can be prevented. For example, the relief section can be a through-hole formed in a direction perpendicular to each of the rotation center axis X and the rotation center axis Y. For example, when the adhesive layers 81 and 82 are thick enough to prevent the contact between the movable plate 221 and the permanent magnet 61 or the like, the recess 611 can be omitted.

The permanent magnet 61 is not particularly limited. For example, a magnetized hard magnetic material such as a neodymium magnet, a ferrite magnet, a samarium-cobalt magnet, an alnico magnet, and a bond magnet can be preferably used.

The permanent magnet 61 can be configured by a magnetized hard magnetic material (in other words, a permanent magnet) being provided on the bottom surface of the driving member 211. Alternatively, the permanent magnet 61 can be configured by the hard magnetic material being provided on the driving member 211 and then magnetized.

The adhesive layers 81 and 82 provided to join the permanent magnet 61 and the driving member 211 are formed, for example, with an adhesive. As a result, the driving member 211 and the permanent magnet 61 can be firmly adhesively bonded. However, the material of the adhesive layers 81 and 82 are not particularly limited as long as the permanent magnet 61 can be provided on the bottom surface of the driving member 211. The adhesive layers 81 and 82 can be omitted depending on the bonding method of the permanent magnet 61 and the driving member 211.

The coil 62 is provided directly below the permanent magnet 61. In other words, the coil 62 is provided so as to face the respective bottom surfaces of the movable plate 221 and the driving member 211. As a result of the coil 62 being provided directly below the permanent magnet 62 in this way, the magnetic field generated by the coil 62 can efficiently work on the permanent magnet 62. As a result, power consumption reduction and size reduction of the actuator 1 can be achieved.

As shown in FIG. 1, the coil 62 is formed so as to surround an outer circumference of the driving member 211, in plan view of FIG. 1. As a result of the coil 62 being formed in this way, contact between the driving member 211 and the coil 62, when the actuator 1 is driven, can be reliably prevented. Therefore, a separating distance between the coil 62 and the permanent magnet 61 can be shortened greatly. The magnetic field generated by the coil 62 can efficiently work on the permanent magnet 61. In other words, the power consumption reduction and size reduction of the actuator 1 can be achieved. The coil 62 can be winded around a magnetic core.

The coil 62 is electrically connected to the voltage applying unit 63. As a result of the voltage applying unit 63 applying the voltage to the coil 62, the coil 62 generates a magnetic field having magnetic flux in an axial direction perpendicular to each of the rotation center axis X and the rotation center axis Y.

As shown in FIG. 3, the voltage applying unit 63 includes a first voltage generating section 631, a second voltage generating section 632, and a voltage superimposing section 633. The first voltage generating section 631 generates a first voltage V1 to rotate the movable plate 221 around the rotation center axis X. The second voltage generating section 632 generates a second voltage V2 to rotate the movable plate 221 around the rotation center axis Y. The voltage superimposing section 633 superimposes the first voltage V1 and the second voltage V2 and applies the superimposed voltage to the coil 62.

As shown in FIG. 4A, the first voltage generating section 631 generates the first voltage V1 that periodically changes at a period T1 (voltage for vertical scanning).

The first voltage V1 has a waveform that is like a sawtooth. Therefore, the actuator 1 can effectively vertically scan light (sub-scan). The waveform of the first voltage V1 is not limited thereto. A frequency (1/T1) of the first voltage V1 is not limited as long as the frequency is suitable for vertical scanning. However, the voltage is preferably from 30 to 80 Hz (about 60 Hz).

According to the embodiment, the frequency of the first voltage V1 is adjusted to be different from a torsional resonance frequency of the first oscillatory system 21 composed of the driving member 211 and the pair of first axial members 212 and 213.

On the other hand, the second voltage generating section 632 generates the second voltage V2 (voltage for horizontal scanning) that periodically changes at a period T2 differing from the period T1.

The second voltage V2 has a waveform that is like a sinewave. Therefore, the actuator 1 can effectively main-scan light. The waveform of the second voltage V2 is not limited thereto.

The frequency of the second voltage V2 is preferably higher than the frequency of the first voltage V1. In other words, the period T2 is preferably shorter than the period T1. As a result, the movable plate 221 can be more reliably and smoothly rotated around the rotation center axis X at the frequency of the first voltage V1 and rotated around the rotation center axis Y at the frequency of the second voltage V2.

The frequency of the second voltage V2 is not particularly limited as long as the frequency differs from the frequency of the first voltage V1 and is a frequency suitable for horizontal scanning. However, the frequency is preferably from 10 to 40 kHz. In this way, as a result of the frequency of the second voltage V2 being from 10 to 40 kHz and the frequency of the first voltage V1 being about 60 Hz as described above, the movable plate 221 can be rotated around the respective axes of the rotation center axis X and the rotation center axis Y at a frequency suitable for drawing an image on a display. However, the frequency of the first voltage V1, the frequency of the second voltage V2, the combination of the frequency of the first voltage V1 and the frequency of the second voltage V2, and the like are not particularly limited, as long as the movable plate 221 can rotate around each of the rotation center axis X and the rotation center axis Y.

According to the embodiment, the frequency of the second voltage V2 is adjusted to be equal with a torsional resonance frequency of the second oscillatory system 22 composed of the movable plate 221 and the pair of second axial members 222 and 223. In other words, the second oscillatory system 22 is designed (manufactured) such that the torsional resonance frequency is a frequency suitable for horizontal scanning. Therefore, a revolution angle of the movable plate 221 around the rotation center axis Y can be made larger.

When the resonance frequency of the first oscillatory system 21 is $f_1$ [Hz] and the resonance frequency of the second oscillatory system 22 is $f_2$ [Hz], $f_1$ and $f_2$ preferably satisfy a relationship of $f_1 > f_2$, and more preferably a relationship of $f_2 \geq 10 f_1$. As a result, the movable plate 221 can more smoothly rotate around the rotation center axis X at the frequency of the first voltage V1 and rotate around the rotation center axis Y at the frequency of the second voltage V2.

The first voltage generating section 631 and the second voltage generating section 632 are respectively connected to the controlling section 7 and are driven based on a signal from the controlling section 7. The voltage superimposing section 633 is connected to the first voltage generating section 631 and the second voltage generating section 632.

The voltage superimposing section 633 includes an adder 633a for applying a voltage to the coil 62. The adder 633a receives the first voltage V1 from the first voltage generating section 631 and the second voltage V2 from the second voltage generating section 632. The adder 633a superimposes the voltages and applies the superimposed voltage to the coil 62.

The actuator 1 configured as described above is driven as follows. According to the embodiment, as described above, the frequency of the first voltage V1 is set to a value different from the torsional resonance frequency of the first oscillatory system 21. The frequency of the second voltage V2 is set to be equal to the torsional resonance frequency of the second oscillatory system 22 and greater than the frequency of the first voltage V1 (for example, the frequency of the first voltage V1 is 60 Hz and the frequency of the second voltage V2 is 15 kHz.)

For example, the voltage superimposing section 633 superimposes the first voltage V1 shown in FIG. 4A, and the second voltage V2 shown in FIG. 4B, and applies the superimposed voltage to the coil 62.

Then, a magnetic field (referred to as a "magnetic field A1") that tends to attract the vicinity of the adhesive layer 81 of the driving member 211 towards the coil 62 and repel the vicinity of the adhesive layer 82 of the driving member 211 from the coil 62, and a magnetic field (referred to as a "magnetic field A2") that tends to repel the vicinity of the adhesive layer 81 of the driving member 211 from the coil 62 and attract the vicinity of the adhesive layer 82 of the driving member 211 towards the coil 62 are alternately switched by the first voltage V1.

Here, in plan view of FIG. 1, the adhesive layer 81 is positioned on one side of the driving member 211 relative to the rotation center axis X. The adhesive layer 82 is positioned on the other side. In other words, the pair of first adhesive layers 81 and 82 is provided on the driving member 211 so as to sandwich the rotation center axis X, in plan view of FIG. 1. Therefore, as a result of the magnetic field A1 and the magnetic field A2 being alternately switched, the driving member 211 rotates around the rotation center X at the frequency of the first voltage V1 with the movable plate 221, while the first axial members 212 and 213 are twisted and deformed.

The frequency of the first voltage V1 is set to be significantly lower than the frequency of the second voltage V2. The resonance frequency of the first oscillatory system 21 is designed to be lower than the resonance frequency of the second oscillatory system 22 (for example, 1/10 or less than the resonance frequency of the second oscillatory system 22). In other words, the driving member 211 rotates around the rotation center axis X by the first voltage V1 because the first oscillatory system 21 is designed to more easily oscillate compared to the second oscillatory system 22. In other words, the driving member 211 is prevented from rotating around the rotation center axis X by the second voltage V2.

On the other hand, a magnetic field (referred to as a "magnetic field B1") that tends to attract the vicinity of the adhesive layer 81 of the driving member 211 towards the coil 62 and repel the vicinity of the adhesive layer 82 of the driving member 211 from the coil 62, and a magnetic field (referred to as a "magnetic field B2") that tends to repel the vicinity of the adhesive layer 81 of the driving member 211 from the coil 62 and attract the vicinity of the adhesive layer 82 of the driving member 211 towards the coil 62 are alternately switched by the second voltage V2.

Here, in plan view of FIG. 1, the adhesive layer 81 is positioned on one side of the driving member 211 relative to the rotation center axis Y. The adhesive layer 82 is positioned on the other side. In other words, the pair of first adhesive layers 81 and 82 is provided on the driving member 211 so as to sandwich the rotation center axis Y, in plan view of FIG. 1. Therefore, as a result of the magnetic field B1 and the magnetic field B2 being alternately switched, the movable plate 221 rotates around the rotation center Y at the frequency of the second voltage V2 (15 kHz), while the second axial members 222 and 223 are twisted and deformed.

The frequency of the second voltage V2 is equal to the torsional resonance frequency of the second oscillatory system 22. Therefore, the movable plate 221 can be dominantly rotated around the rotation center axis Y by the second voltage V2. In other words, the movable plate 221 is prevented from rotating around the rotation center axis Y by the first voltage V1.

Therefore, in the actuator 1, as a result of the voltage obtained by superimposing the first voltage V1 and the second voltage V2 being applied to the coil 62, the movable plate 221 can be rotated around the rotation center axis X at the frequency of the first voltage V1 and rotated around the rotation center axis Y at the frequency of the second voltage V2. As a result, the movable plate 221 can be very smoothly rotated around each of the rotation center axis X and the rotation center axis Y while achieving low costs and downsizing.

In particular, because the respective numbers of permanent magnets and coils serving as a drive source can be reduced, a simple and compact configuration can be achieved.

As a result of the first voltage V1 and the second voltage V2 being changed accordingly, a desired oscillation characteristic can be obtained without changes being made to the designs of the substrate 2 and the permanent magnet 61.

In the actuator 1, the permanent magnet 61 is provided on the driving member 211, and the coil 62 is provided on the counter substrate 5 so as to face the permanent magnet 61. In other words, the coil 62 serving as a heating element is not provided in the first oscillatory system 21. Therefore, thermal expansion of the substrate 2 caused by the heat generated from the coil 62 through energization can be suppressed. As a result, the actuator 1 can achieve the desired oscillation characteristics even when consecutively used over a long period of time.

The actuator 1 includes the light reflecting section 221a. Therefore, the actuator 1 can be suitably applied to, for example, an optical scanner included in image forming devices, such as laser printers, bar code readers, confocal scanning laser microscopes, and imaging displays. The optical scanner of the present invention has the same configuration as the above-described actuator. Explanation thereof will be omitted.

Here, based on FIG. 5, when the actuator 1 is used as the optical scanner in the imaging display will be described as an example of the image forming device. A longitudinal direction of a screen S is referred to as a "horizontal direction". A direction perpendicular to the longitudinal direction is referred to as a "vertical direction". The rotation center axis X is in parallel with the horizontal direction of the screen S. The rotation center axis Y is in parallel with the vertical direction of the screen S.

An image forming device (projector) 9 includes a light source device 91, a plurality of dichroic mirrors 92, and the actuator 1. The light source device 91 emits light, such as a laser.

The light source device 91 includes a red light source device 911 that emits a red light component, a blue light source device 912 that emits a blue light component, and a green light source device 913 that emits a green light component.

Each dichroic mirror 92 is an optical element that synthesizes the light components respectively emitted from the red light source device 911, the blue light source device 912, and the green light source device 913.

The projector 9 is configured such that, based on image information from a host computer (not shown), the dichroic mirrors 92 synthesizes the light components emitted from the light source device 91 (the red light source device 911, the blue light source device 912, and the green light source device 913). The actuator 1 two-dimensionally scans the synthesized light, and a color image is formed on the screen S.

During the two-dimensional scan, the light reflected by the light reflecting section 221a is scanned (main scan) in the horizontal direction of the screen S, as a result of the movable plate 221 of the actuator 1 rotating around the rotation center axis Y. On the other hand, the light reflected by the light reflecting section 221a is scanned (sub-scan) in the vertical direction of the screen S by the movable plate 221 of the actuator 1 rotating around the rotation center axis X.

Figure 5:
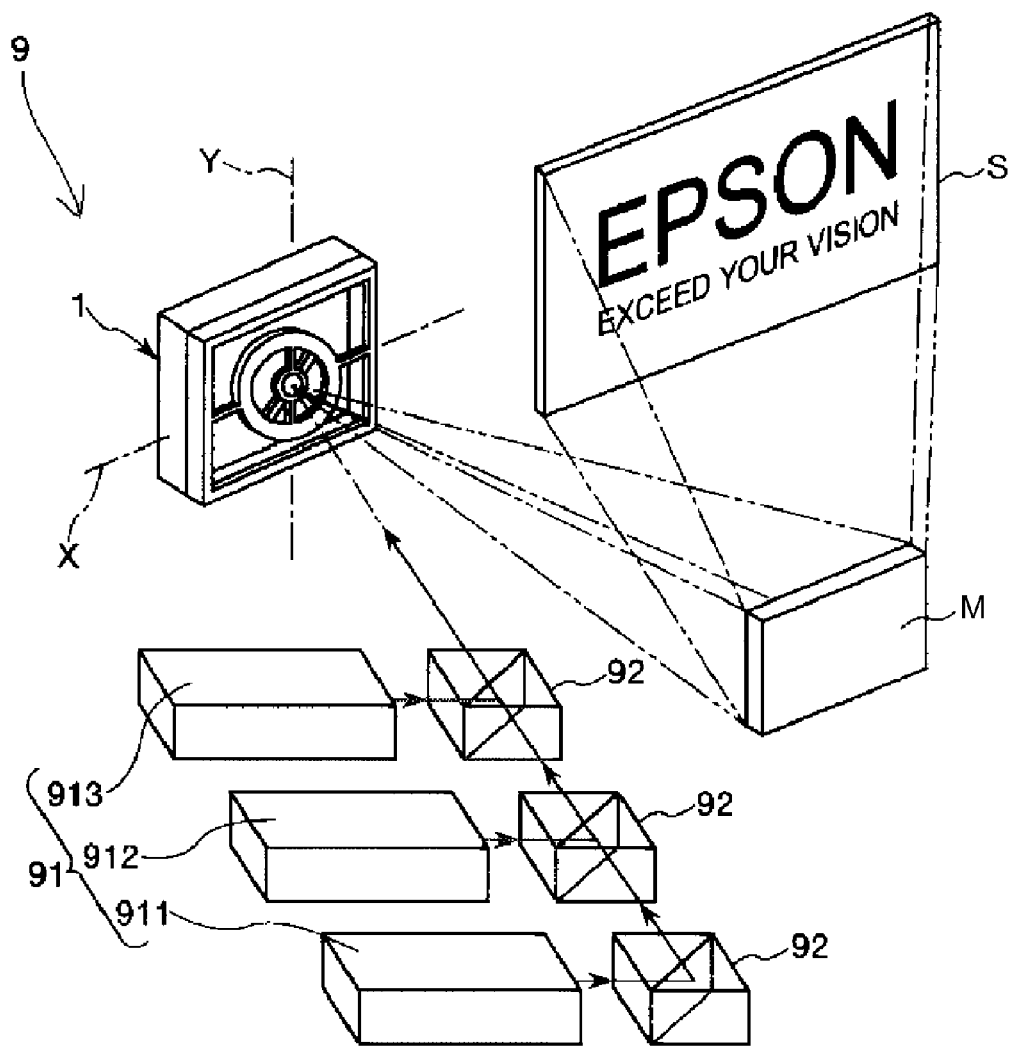
FIG. 5 is a schematic view illustrating an image forming device of the invention.

In FIG. 5, after the actuator 12 two-dimensionally scans the light synthesized by the dichroic mirrors 92, the image is formed on the screen S after the light is reflected by a fixed mirror M. However, the fixed mirror M can be omitted. The light two-dimensionally scanned by the actuator 1 can be directly irradiated onto the screen S.

While the actuator, the optical scanner, and the image forming apparatus of the invention are described based on the illustrated embodiments thus far, but the invention is not limited to those embodiments. For example, the actuator, the optical scanner, and the image forming apparatus of the invention may include any substitute that has the same function as its original structure and may include any additional structure.

According to the above-described embodiment, the actuator is almost symmetrical relative to each of the X-axis and the Y-axis. However, the actuator can be asymmetrical.

According to the above-described embodiment, that using a permanent magnet having a longitudinal shape is described. However, the shape of the permanent magnet is not particularly limited, as long as the line segment connecting both poles is provided so as to slant with respect to each of the X-axis and the Y-axis, in a plan view of the movable plate. For example, the permanent magnet can have a circular or square shape, in the plan view of the movable plate. In addition, for example, a pair of yokes can be provided so as to sandwich the permanent magnet in a direction of the line segment connecting both poles. The yokes can lead the magnetic flux.

What is claimed is:

1. An actuator, comprising:
a first oscillatory system including a frame-shaped driving member and a pair of first axial members holding the driving member so as to allow the driving member to rotate around a first axis;
a second oscillatory system including a movable member provided inside the frame of the driving member and a pair of second axial members holding the movable member to the driving member so as to allow the movable member to rotate around a second axis perpendicular to the first axis; and
a driving unit including a permanent magnet of longitudinal shape provided on the driving member, a coil provided so as to face the permanent magnet, and a voltage applying unit applying a voltage to the coil,
wherein, the permanent magnet is provided such that the longitudinal line of the permanent magnet is slanted with respect to each of the first and the second axis, in a plan view of the movable member,
the movable member has a circular shape in the plan view, and
the movable member is rotated around both the first axis and around the second axis.

2. The actuator according to claim 1, wherein
the voltage is obtained by superimposing a first voltage and a second voltage, and
the frequency of the first voltage is equal to a resonance frequency of the first oscillatory system or the frequency of the second voltage is equal to a resonance frequency of the second oscillatory system.

3. The actuator according to claim 2, wherein the frequency of the second voltage is equal to the resonance frequency of the second oscillatory system and the frequency of the first voltage differs from the resonance frequency of the first oscillatory system.

4. The actuator according to claim 1, wherein
the voltage is obtained by superimposing a first voltage and a second voltage, and
the frequency of the second voltage is higher than the frequency of the first voltage.

5. The actuator according to claim 1, wherein the permanent magnet is provided along a line segment that passes through an intersection of the first axis and the second axis, and slants at an angle of from 30 to 60 degrees with respect to the first axis or the second axis.

6. The actuator according to claim 1, wherein the coil is provided directly below the permanent magnet.

7. The actuator according to claim 1, wherein the coil is formed so as to surround an outer circumference of the driving member, in the plan view of the movable member.

8. The actuator according to claim 1, wherein the movable member has a light reflecting section having a light reflective characteristic on one surface opposing the other surface facing the permanent magnet.

9. An optical scanner, comprising:
a first oscillatory system including a frame-shaped driving member and a pair of first axial members holding the driving member so as to allow the driving member to rotate around a first axis;
a second oscillatory system including a movable member provided inside the frame of the driving member and a pair of second axial members holding the movable member to the driving member so as to allow the movable member to rotate around a second axis perpendicular to the first axis; and a driving unit including a permanent magnet of longitudinal shape provided on the driving member, a coil provided so as to face the permanent magnet, and a voltage applying unit applying a voltage to the coil, wherein, the permanent magnet is provided such that the longitudinal line of the permanent magnet is slanted with respect to each of the first and the second axis, in a plan view of the movable member, the movable member has a circular shape in the plan view, and the voltage applying unit applied voltage to the coil, and the movable member is rotated both of around the first axis and around the second axis, and light reflected by the light reflecting section is two-dimensionally scanned.

10. An image forming device, comprising an optical scanner including:

a first oscillatory system including a frame-shaped driving member and a pair of first axial members holding the driving member so as to allow the driving member to rotate around a first axis;

a second oscillatory system including a movable member provided inside the frame of the driving member and a pair of second axial members holding the movable member to the driving member so as to allow the movable member to rotate around a second axis perpendicular to the first axis; and a driving unit including a permanent magnet of longitudinal shape provided on the driving member, a coil provided so as to face the permanent magnet, and a voltage applying unit applying a voltage to the coil, wherein, the permanent magnet is provided such that the longitudinal line of the permanent magnet is slanted with respect to each of the first and the second axis, in a plan view of the movable member, the movable member has a circular shape in the plan view, and the voltage applying unit applied voltage to the coil, and the movable member is rotated both of around the first axis and around the second axis, and light reflected by the light reflecting section is two-dimensionally scanned.

* * * * *